(12) United States Patent
Clement et al.

(10) Patent No.: US 12,138,972 B2
(45) Date of Patent: Nov. 12, 2024

(54) TIRE FOR A HEAVY CIVIL-ENGINEERING VEHICLE WITH A SIMPLIFIED CROWN REINFORCEMENT

(71) Applicant: COMPAGNIE GENERALE DES ETABLISSEMENTS MICHELIN, Clermont-Ferrand (FR)

(72) Inventors: Emmanuel Clement, Clermont-Ferrand (FR); Sylvie Lhospitalier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 17 days.

(21) Appl. No.: 17/628,799

(22) PCT Filed: Jul. 7, 2020

(86) PCT No.: PCT/FR2020/051205
§ 371 (c)(1),
(2) Date: Jan. 20, 2022

(87) PCT Pub. No.: WO2021/014065
PCT Pub. Date: Jan. 28, 2021

(65) Prior Publication Data
US 2022/0371369 A1 Nov. 24, 2022

(30) Foreign Application Priority Data
Jul. 23, 2019 (FR) .................................. 1908339

(51) Int. Cl.
*B60C 9/18* (2006.01)
*B60C 9/00* (2006.01)
*B60C 9/28* (2006.01)

(52) U.S. Cl.
CPC ............. *B60C 9/18* (2013.01); *B60C 9/0007* (2013.01); *B60C 2009/0021* (2013.01)

(58) Field of Classification Search
CPC . B60C 2009/2058; B60C 9/20; B60C 9/2003; B60C 9/2009; B60C 2009/2048; B60C 2009/2051
See application file for complete search history.

(56) References Cited

U.S. PATENT DOCUMENTS 3,807,475 A * 4/1974 Sperberg ................... B60C 9/06
152/526
4,234,031 A * 11/1980 Pommier .............. B60C 9/2009
152/534

(Continued)

FOREIGN PATENT DOCUMENTS

WO 2005/014925 A1 2/2005
WO 2007/090603 A1 8/2007
WO 2016/184756 A1 11/2016

OTHER PUBLICATIONS

International Search Report dated Sep. 15, 2020, in corresponding PCT/FR2020/051205 (4 pages).

*Primary Examiner* — Justin R Fischer
(74) *Attorney, Agent, or Firm* — VENABLE LLP

(57) ABSTRACT

A tire for a heavy-duty vehicle of construction plant type comprises a crown reinforcement (35) radially on the inside of a tread (10) and radially on the outside of a carcass reinforcement (50). The crown reinforcement (35) comprises: at least one "low-modulus" layer (20) formed of elastic metal reinforcers having a structural elongation at least equal to 0.4%, and a total elongation at break at least equal to 3%, and a tensile elastic modulus of between 40 GPa and 130 GPa; at least one "rigid" layer (30) formed of rigid metal reinforcers, the structural elongation of which is less than or equal to 0.2% and the tensile elastic modulus of (Continued)

which is between 140 GPa and 200 GPa. The ratio of the breaking tension of the rigid layer to that of the low-modulus layer is greater than or equal to 1.2.

8 Claims, 2 Drawing Sheets

(56) References Cited

U.S. PATENT DOCUMENTS

| | | | |
|---|---|---|---|
| 5,843,583 | A | 12/1998 | D'Haene et al. |
| 7,337,604 | B2 | 3/2008 | Vanneste et al. |
| 8,166,741 | B2 | 5/2012 | Barguet et al. |
| 10,933,694 | B2 | 3/2021 | Domingo et al. |
| 10,940,719 | B2 | 3/2021 | Clement et al. |
| 2006/0032570 | A1 | 2/2006 | Callamand et al. |
| 2006/0179813 | A1 | 8/2006 | Vanneste et al. |
| 2009/0294009 | A1 | 12/2009 | Barguet et al. |
| 2013/0261223 | A1* | 10/2013 | Cheng .................... D07B 7/025 523/222 |
| 2015/0251497 | A1* | 9/2015 | Ferlin .................... B60C 9/0007 152/535 |
| 2018/0126785 | A1 | 5/2018 | Navaro-Losada et al. |

* cited by examiner

TIRE FOR A HEAVY CIVIL-ENGINEERING VEHICLE WITH A SIMPLIFIED CROWN REINFORCEMENT

BACKGROUND

The subject of the present invention is a radial tyre intended to be fitted to a heavy-duty vehicle of construction plant type, and the invention relates more particularly to the crown reinforcement of such a tyre.

Typically, this radial tyre for a heavy-duty vehicle of construction plant type, within the meaning of the European Tyre and Rim Technical Organisation or ETRTO standard, is intended to be mounted on a rim with a diameter at least equal to 20 inches.

Since a tyre has a geometry exhibiting symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The circumferential direction is tangential to the circumference of the tyre.

In the following text, the expressions "radially inner/radially on the inside" and "radially outer/radially on the outside" mean "closer to" and "further away from the axis of rotation of the tyre", respectively. "Axially inner/axially on the inside" and "axially outer/axially on the outside" mean "closer to" and "further away from the equatorial plane of the tyre", respectively, with the equatorial plane of the tyre being the plane that passes through the middle of the tread surface and is perpendicular to the axis of rotation.

Generally, a tyre comprises a tread intended to come into contact with the ground via a tread surface, the two axial ends of which are connected via two sidewalls to two beads that provide the mechanical connection between the tyre and the rim on which it is intended to be mounted.

A radial tyre also comprises a reinforcement made up of a crown reinforcement radially on the inside of the tread and a carcass reinforcement radially on the inside of the crown reinforcement.

The carcass reinforcement of a radial tyre for a heavy-duty vehicle of construction plant type usually comprises at least one carcass layer comprising generally metal reinforcers that are coated in a polymeric material of the elastomer or elastomeric type that is obtained by blending and is known as a coating compound. A carcass layer comprises a main part that joins the two beads together and is generally wound, in each bead, from the inside of the tyre to the outside, around a usually metal circumferential reinforcing element known as a bead wire so as to form a turn-up. The metal reinforcers of a carcass layer are substantially mutually parallel and form an angle of between 85° and 95° with the circumferential direction.

The crown reinforcement of a radial tyre for a heavy-duty vehicle of construction plant type comprises a superposition of circumferentially extending crown layers, radially on the outside of the carcass reinforcement. Each crown layer is made up of generally metal reinforcers that are mutually parallel and are coated in a polymeric material of the elastomer or coating compound type.

Among the crown layers, a distinction is usually made between the protective layers, which make up the protective reinforcement and are radially outermost, and the working layers, which make up the working reinforcement and are radially comprised between the protective reinforcement and the carcass reinforcement.

The protective reinforcement, which comprises at least one protective layer, essentially protects the working layers from mechanical or physicochemical attacks, which are likely to spread through the tread radially towards the inside of the tyre.

The protective reinforcement often comprises two radially superposed protective layers formed of elastic metal reinforcers that are mutually parallel in each layer and are crossed from one layer to the next, forming angles at least equal to 10° and at most equal to 35° with the circumferential direction.

The working reinforcement, comprising at least two working layers, has the function of belting the tyre and conferring stiffness and road holding thereon. It absorbs both mechanical inflation stresses, which are generated by the tyre inflation pressure and transmitted by the carcass reinforcement, and mechanical stresses caused by running, which are generated as the tyre runs over the ground and are transmitted by the tread. It is also intended to withstand oxidation and impacts and perforation, by virtue of its intrinsic design and that of the protective reinforcement.

The working reinforcement usually comprises two radially superposed working layers formed of inextensible metal reinforcers that are mutually parallel in each layer and are crossed from one layer to the next, forming angles at most equal to 60°, and preferably at least equal to 15° and at most equal to 45°, with the circumferential direction.

In order to reduce the mechanical inflation stresses that are transmitted to the working reinforcement, it is known practice to dispose a hoop reinforcement radially on the outside of the carcass reinforcement. The hoop reinforcement, the function of which is to at least partially absorb the mechanical inflation stresses, improves the endurance of the crown reinforcement by stiffening the crown reinforcement. The hoop reinforcement can be positioned radially on the inside of the working reinforcement, between the two working layers of the working reinforcement, or radially on the outside of the working reinforcement.

The hoop reinforcement usually comprises two radially superposed hooping layers formed of metal reinforcers that are mutually parallel in each layer and are crossed from one layer to the next, forming angles at most equal to 10° with the circumferential direction.

As regards the metal reinforcers, a metal reinforcer is mechanically characterized by a curve representing the tensile force (in N) applied to the metal reinforcer as a function of the relative elongation (in %) thereof, known as the force-elongation curve. Mechanical tensile characteristics of the metal reinforcer, such as the structural elongation As (in %), the total elongation at break At (in %), the force at break Fm (maximum load in N) and the breaking strength Rm (in MPa) are derived from this force-elongation curve, these characteristics being measured in accordance with the standard ISO 6892 of 1984.

The total elongation at break At of the metal reinforcer is, by definition, the sum of the structural, elastic and plastic elongations thereof (At=As+Ae+Ap). The structural elongation As results from the relative positioning of the metal threads making up the metal reinforcer under a low tensile force. The elastic elongation Ae results from the actual elasticity of the metal of the metal threads making up the metal reinforcer, taken individually, the behaviour of the metal following Hooke's law. The plastic elongation Ap results from the plasticity, i.e. the irreversible deformation beyond the yield point, of the metal of these metal threads taken individually. These various elongations and the respective meanings thereof, which are well known to a person skilled in the art, are described, for example, in the documents U.S. Pat. No. 5,843,583, WO2005/014925 and WO2007/090603.

Also defined, at any point on the stress-deformation curve of a metal reinforcer, is a tensile modulus, expressed in GPa, which represents the gradient of the straight line tangential to the stress-deformation curve at this point. In particular, the tensile modulus of the elastic linear part of the stress-deformation curve is referred to as the tensile elastic modulus or Young's modulus.

Among the metal reinforcers, a distinction is usually made between the elastic metal reinforcers, such as those used in the protective layers, and the inextensible or non-extensible metal reinforcers, such as those used in the working layers.

An elastic metal reinforcer is characterized by a structural elongation As at least equal to 0.4% and a total elongation At break At at least equal to 3%. Moreover, an elastic metal reinforcer has a tensile elastic modulus at most equal to 130 GPa, and usually between 40 GPa and 130 GPa.

An inextensible metal reinforcer is characterized by an elongation, under a tensile force equal to 10% of the force at break Fm, at most equal to 0.2%. Moreover, an inextensible metal reinforcer has a tensile elastic modulus greater than 140 GPa.

A layer made up of metal reinforcers coated in an elastomeric compound is referred to as "rigid" if the reinforcers are inextensible as described above. The layer is referred to as "low-modulus" relative to the rigid layer if the reinforcers are elastic as defined above.

The indentation stiffness of a tyre is a physical quantity indicative of the resistance of the crown to perforation when running over an indenter such as a rock, for example, having a size of several tens of centimetres. The lower the indentation stiffness, the better the crown performs in terms of absorbing obstacles.

In order to measure the indentation stiffness of a tyre, a test involving running over standardized obstacles is performed. These obstacles are hemispherical-head polars of varying heights and diameters. Typically, the diameter of the polar varies from 0.5 inches to 3 inches, for a height of between 25 mm and 400 mm. The tyre is mounted on the rim of a vehicle of the dumper type and inflated. A number of successive passes over the polar are performed, with the height of the polar being progressively increased. The test is ended when, on running over a sufficiently tall polar, the crown of the tyre being tested is finally perforated.

The "breaking energy" test as defined for example in the US standard FMVSS 119 relating to the safety of tyres makes it possible to quantify the resistance of the crown of a tyre to perforation. This is a test on a machine, which consists in pressing a polar into the crown of an inflated tyre mounted on a rim. The operation is repeated several times at different points at the centre of the tread. The radial pressing force and the depth of penetration are measured in order to calculate the penetration energy, which needs to be below a threshold fixed by the standard depending on the size and the specifications of the tyre in question. The polars have a hemispherical head of variable diameter depending on the tyre size. Typically, the diameter of the polar varies from 0.5 to 3 inches for the sizes considered here.

By way of indication, a size designated 29.5R25 according to the ETRTO standard and intended to bear a load of 14 000 kilos at a pressure of 450 Pa comprises at most seven crown reinforcement layers formed of metal reinforcers coated in an elastomeric compound.

The manufacturing and material costs of such a tyre are relatively high on account of the complexity of the architecture and the large number of components necessary for producing it.

The inventors set themselves the objective of simplifying the architecture of a radial tyre for a heavy-duty vehicle of construction plant type, with the aim of reducing the weight by at least 7% without having a negative effect on the endurance performance of the tyre.

SUMMARY

This objective has been achieved by a tyre for a heavy-duty vehicle of construction plant type, comprising, radially from the outside to the inside:
a) at least one layer, denoted "low-modulus layer" below, formed of what are known as low-modulus elastic metal reinforcers, which are coated in an elastomeric material, are mutually parallel and form an angle Alpha1 with a circumferential direction (XX') tangential to the circumference of the tyre, said low-modulus reinforcers having a structural elongation at least equal to 0.4% and a total elongation at break at least equal to 3%, and the tensile elastic modulus of these reinforcers being between 40 GPa and 130 GPa;
b) at least one layer, denoted "rigid layer" below, formed of rigid metal reinforcers, which are coated in an elastomeric material, are mutually parallel and form an angle Alpha2 with a circumferential direction (XX') tangential to the circumference of the tyre, the structural elongation of the rigid metal reinforcers, under a tensile force equal to 10% of the force at break, being less than or equal to 0.2% and the tensile elastic modulus of the rigid reinforcers being between 140 GPa and 200 GPa,
c) the rigid layer has a breaking tension greater than or equal to 120 daN/mm, the ratio of the breaking tension of the rigid layer to that of the low-modulus layer is greater than or equal to 1.2,
d) the low-modulus layer has a breaking tension greater than or equal to 80 daN/mm,
e) at least one low-modulus layer is in contact with at least one rigid layer over an axial width W at least equal to 20% of the nominal section B of the tyre within the meaning of the ETRTO standard.

DETAILED DESCRIPTION

The main idea of the invention is to form a multilayer composite having a rigid layer and a low-modulus layer as a base element of the architecture of the crown. Depending on the intended use of the tyre, a triangulation layer, comprising reinforcers that form an angle at least equal to 50° with the circumferential direction, or a hoop reinforcement, made up of at least one hooping layer comprising reinforcers that form an angle at most equal to 10° with the circumferential direction, can be added to the base element.

The radially innermost rigid layer is reinforced in design terms in order to replace the two working layers of the usual working reinforcement. The radially outer low-modulus layer, closest to the tread, replaces the two protective layers of the usual protective reinforcement. Therefore, the invention represents a simplification of conventional crown architectures that generally comprise at least five crown layers necessary for achieving equivalent operation of the tyre.

The same coating compound is used for the rigid layer and for the low-modulus layer. The thickness of the coating compound between the two layers, the angles of the reinforcers of each layer, and the Young's moduli of the reinforcers are chosen so as to ensure the mechanical coupling of the two layers.

The mechanically coupled state of the multilayer is realized when the shear of the coating compound of the rigid layer and of the low-modulus layer in the meridian plane of the tyre is zero. The tension in the reinforcers of the two layers then reaches its maximum value. The tension in the reinforcers varies from a value of zero at the axial ends of the layers to the maximum possible value along the coupling distance.

During the inflation of the tyre mounted on its rim, a uniform rise in the profile of the crown in the meridian plane is decisive for the performance aspects of the tyre, in particular for the wear pattern of the tread, which needs to be as uniform as possible. The adjustment of the radial stiffnesses in connection with the mechanical coupling of the rigid layer and low-modulus layer is therefore instrumental for ensuring the performance aspects of the tyre.

According to the invention, the breaking tension of the rigid layer is greater than or equal to 120 daN/mm.

A radial tyre subjected to its inflation pressure generates meridian tension that is taken up by the reinforcers of the radial carcass reinforcement, which, by shearing of the coating compound, transmits the tension to the reinforcers of the crown reinforcement.

The radially innermost crown layer is reinforced such that the breaking tension of the layer is greater than or equal to 120 daN/mm. The design of the tyre according to the invention with a smaller number of crown layers allows it to resist the inflation pressure with a sufficient safety margin.

Still according to the invention, the breaking tension of the low-modulus layer is greater than or equal to 80 daN/mm.

The breaking tension of the low-modulus layer needs to be greater than a threshold which, according to the inventors, is equal to 80 daN/mm. This constraint is satisfied for elastic cables of 24.26 assembly, meaning cables made up of 24 threads each measuring 26 hundredths of a millimetre.

These levels of tension determine the operating range of the invention.

Also according to the invention, the ratio of the breaking tension of the rigid layer to that of the low-modulus layer is greater than or equal to 1.2, preferably greater than or equal to 1.4.

The invention defines a crown reinforcement comprising a rigid layer facing a low-modulus layer. This design choice results from the compromise found in order to have sufficient cornering stiffness for the transverse operation of the tyre while having a relatively flexible elastic protective layer for protecting the crown. The low-modulus layer plays a dual role: firstly, this layer couples with the rigid layer to achieve the necessary stiffness level that contributes to guiding the vehicle, and secondly, said low-modulus layer protects the crown by being sufficiently elastic to shape itself when rolling over obstacles. The inventors have found that, in order to ensure these two functions under satisfactory conditions, the ratio of the tension in the rigid layer to that of the low-modulus layer needs to be equal to 1.2.

According to the invention, at least one low-modulus layer is in contact with at least one rigid layer over an axial width W at least equal to 20% of the nominal section B of the tyre within the meaning of the ETRTO standard.

The rigid layer and low-modulus layer are placed in contact to achieve mechanical coupling between the two layers which corresponds to the state of maximum stress of the reinforcers in the meridian plane. The stress in the reinforcers is related to the variation in shear stresses in the coating compound of the layer. The stress increases continuously from the axial end of the layer, where it is zero, to a maximum value that is reached starting at a certain axial position on the layers. The distance covered to reach the maximum value of the stress is the coupling distance. The width of the low-modulus layer needs to be sufficient to make it possible to achieve mechanical coupling.

The coupling distance depends on several mechanical parameters such as the tensile elastic moduli of the reinforcers, the shear modulus of the coating compound. The inventors have established that if the rigid layer and low-modulus layer are in contact over a distance at least equal to 20% of the nominal width of the tyre, the coupling between the two layers can be achieved.

It is advantageous that the rigid layer comprises reinforcers comprising a wrapping thread of small diameter, between 0.10 mm and 0.3 mm, wound in a helix on the external surface of the reinforcer.

As it runs, a construction plant tyre generates buckling stresses in the cables of the carcass ply, which are made to bend to a significant degree, such that they tend to buckle, leading to an increase in the curvature of the individual threads, causing thread breakages. These cables may then break prematurely, thus determining the running endurance limit of the tyre. Just as in the case of the carcass layer, the rigid layer uses the solution of wrapping with a thread of small diameter of between 0.10 mm and 0.3 mm in order to improve its endurance performance.

According to one embodiment of the invention, the low-modulus layer is positioned on the outside of the rigid layer in the radial direction.

The more flexible layer is positioned radially closest to the tread. Said layer contributes to obtaining a level of indentation stiffness that allows the crown to deform so as to absorb the obstacles on tracks while the tyre is running.

Advantageously, the axial width of the low-modulus layer is greater than the axial width of the rigid layer by a distance DNT at least equal to 10 mm at each axial end.

The ends of the reinforcers of the layers are mechanical singularities with zero-stress conditions and shear stresses of large amplitude. Said ends are thus staggered at spacings of at least 10 mm in the axial direction so as to avoid them coinciding in one and the same meridian plane.

According to one embodiment of the invention, an additional, triangulation layer, comprising metal reinforcers, which are coated in an elastomeric material, are mutually parallel and form an angle Beta with a circumferential direction (XX') tangential to the circumference of the tyre, is positioned on the inside of the rigid layer and in contact therewith in the radial direction, said angle Beta being greater than or equal to 50° in terms of absolute value and in the same direction as the adjacent rigid layer.

The triangulation layer is made up of rigid metal threads or cables of low extensibility that make an angle Beta of between 45° and 90° with the circumferential direction, and is positioned between the carcass reinforcement and the rigid layer, which likewise comprises rigid reinforcers that make an angle with a value of less than 45° in terms of absolute value with the circumferential direction. Said triangulation layer forms a triangulated reinforcement with the rigid layer, this reinforcement having low deformation under the various stresses which it undergoes, the triangulation layer essentially serving to absorb the transverse compressive forces that act on all the reinforcing elements in the crown region of the tyre.

In this embodiment, in fine, the tyre comprises a carcass reinforcement on which the triangulation layer is positioned in the radially outward direction, followed by the stack of the rigid layer and the low-modulus layer, the whole being surmounted by the tread.

Advantageously, the axial width of the triangulation layer, measured in a meridian cross section of the tyre, is less than that of the low-modulus layer and greater than that of the rigid layer.

The low-modulus layer has an axial width greater than that of the rigid layer by at least 20 mm. As for the triangulation layer, its width is defined so as to bring about coupling with the low-modulus layer in order to limit the shear stresses at the axial ends so as to defend against problems of cleavage of the crown. This mechanical condition associated with the constraint of avoiding coincidence of the axial ends leads to the definition of the end of the triangulation layer between axial ends of the rigid layer and low-modulus layer.

Preferably, the absolute value of the angle Alpha1 of the reinforcers of the low-modulus layer is greater than or equal to the absolute value of the angle Alpha2 of the reinforcers of the rigid layer.

The absolute values of the angles of the low-modulus layer and of the rigid layer are both comprised in the range [15°; 40°], but the angle of the rigid layer is smaller than that of the low-modulus layer, meaning that it is closer to the 15° limit. In reality, the angle Alpha2 of the rigid layer closer to the circumferential direction is used to contribute to the stiffening of the rigid layer in the circumferential direction.

By way of illustration, a combination of angles Alpha1 at 24° and Alpha2 at −20° allows good operation of the invention.

According to one embodiment of the invention, the crown reinforcement comprises at least one hooping layer formed of elastic metal reinforcers, the angle of which with the circumferential direction of the tyre is less than or equal to 10°.

The simplified architecture of the tyre according to the invention is compatible with the use of a hoop reinforcement. For particular uses in which the tyres are highly stressed for example when cornering, a hoop reinforcement can be added to the crown proposed by the invention.

The hoop reinforcement usually comprises two radially superposed hooping layers formed of metal reinforcers that are mutually parallel in each layer and are crossed from one layer to the next, forming angles at most equal to 10° with the circumferential direction.

The hoop reinforcement, the function of which is to at least partially absorb the mechanical inflation stresses, improves the endurance of the crown reinforcement by stiffening the crown reinforcement. The hoop reinforcement can be positioned radially between the rigid layer and the low-modulus layer of the working reinforcement or radially on the outside of the working reinforcement.

According to another embodiment of the invention, a layer of elastomeric compound is positioned towards the inside in the radial direction, beneath the low-modulus layer and in contact with the latter vertically in line with the end of the rigid layer.

Preferably, the layer of elastomeric compound positioned radially beneath the "low-modulus" layer and in contact with the latter vertically in line with the end of the rigid layer has a tensile stiffness modulus less than or equal to 4.5 MPa.

The low-modulus layer is the one with the greatest axial width, and at its axial ends, the deformations in the meridian and circumferential planes have large amplitudes. The addition of an edging layer at the end of the low-modulus layer on the inside in the radial direction has the advantage of localizing the shear deformations there. This solution makes it possible to improve the endurance of the tyre with respect to cleavage.

Located in the environment of the layer of compound added to the low-modulus layer on the inside in the radial direction are the coating compound of the low-modulus layer and the edging compound, which borders the axial end. The tensile elastic modulus of the compound attached to the low-modulus layer needs to be lower than that of the surrounding compounds. The inventors have found that a value of the tensile elastic modulus less than or equal to 4.5 MPa is sufficient for proper operation of the invention.

BRIEF DESCRIPTION OF THE FIGURES

The features of the invention are illustrated in the schematic FIGS. 1 and 2, which are not to scale, with reference to a tyre of size 29.5R25:

FIG. 1 shows a tyre 1 for a heavy-duty vehicle of construction plant type, comprising a crown reinforcement 35 radially on the inside of a tread 10 and radially on the outside of a carcass reinforcement 50. The crown reinforcement 35 comprises at least one layer 20, known as the "low-modulus layer", and at least one layer 30, known as the "rigid layer". A layer of elastomeric compound 25 is positioned radially on the interior side of the low-modulus layer. The radially innermost crown reinforcement layer 40, in contact with the carcass reinforcement 50, is known as the triangulation layer. The ends of the layers 20, 30 and 40 are embedded in an elastomeric edging compound 110. The rigid crown layer 30 and low-modulus crown layer 20 are separated at their axial ends by a decoupling compound 90.

FIG. 2 shows the crown reinforcement 35 with its characteristic dimensions. The rigid layer has an axial width LNT1 and the low-modulus layer has a width LNT2. The width LNT2 is greater than LNT1 such that the low-modulus layer extends beyond the ends of the rigid layer on both sides. The axial ends of the triangulation layer of width LNTS are interposed between the axial ends of the low-modulus layer and rigid layer. In order to avoid coincidence of the axial ends of the crown layers, an offset of at least 10 mm is provided between two consecutive layers. LCOUP is the coupling distance for achieving the maximum level of tension in the reinforcers of the crown layers.

FIG. 3 shows an example of low-modulus reinforcers used for the low-modulus layer. The cable comprises 4 strands 200 wound in a helix, each strand being made up of an internal layer 220 of one thread, surrounded by an external layer 230 formed of 4 threads 210 wound around the internal layer.

Figure 1:
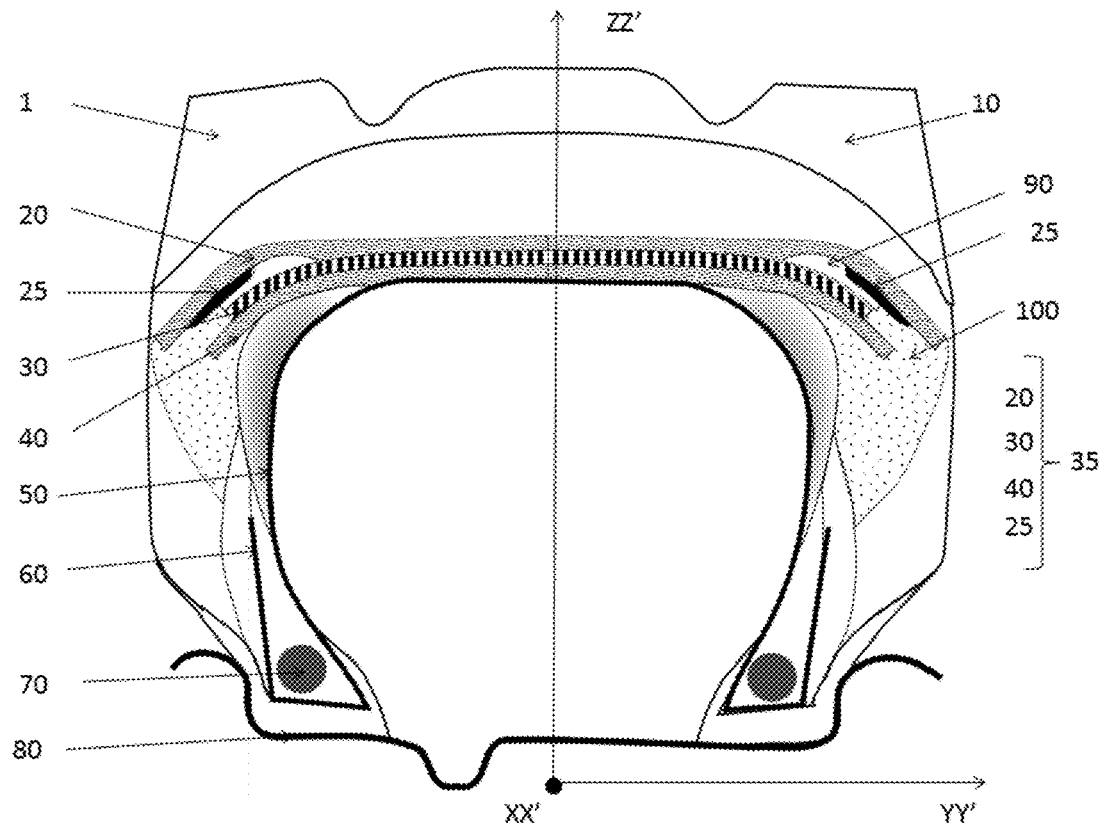
FIG. 1: meridian cross section through the crown of the tyre according to the invention.
Figure 2:
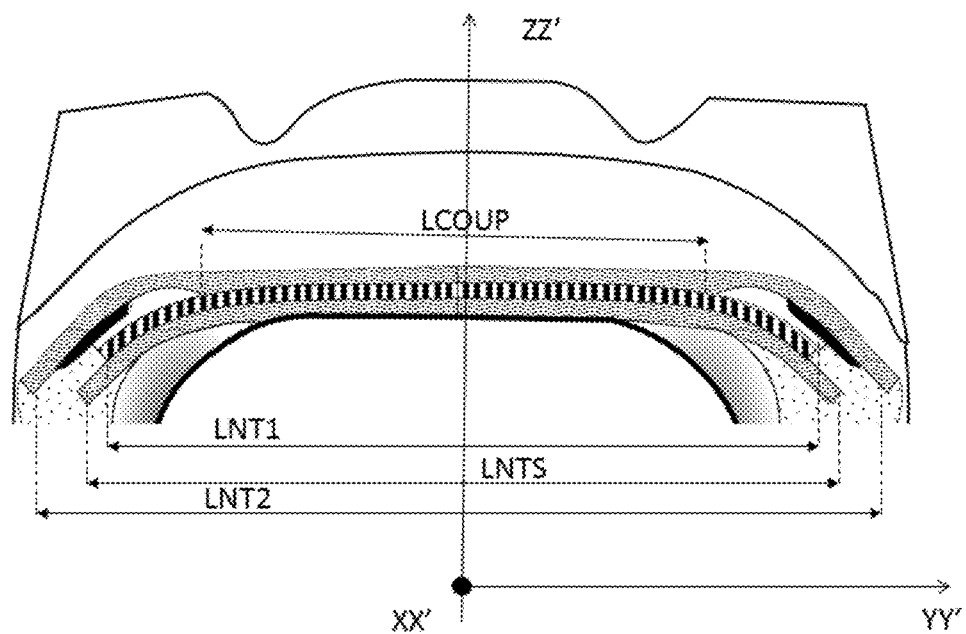
FIG. 2: portion of a meridian cross section through said crown.
Figure 3:
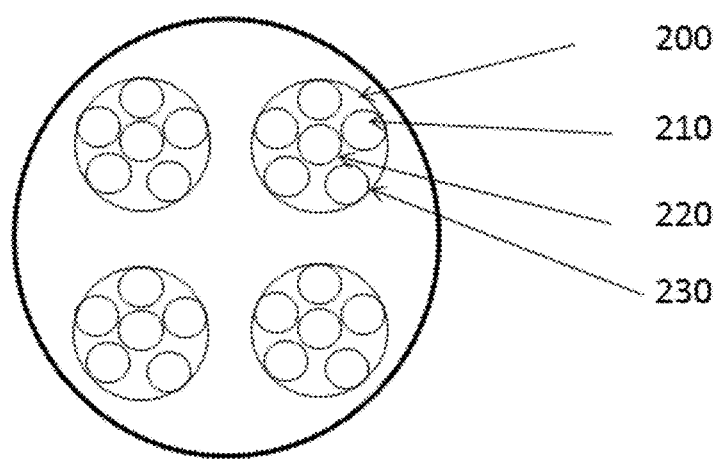
FIG. 3: illustration of the assembly of a cable as used in the invention.

The inventors compared a tyre I according to the invention against a reference tyre R of the same size 29.5R25. The reference tyre is a conventional prior art solution, the description of which is summarized in Table 1 below:

TABLE 1

Crown reinforcement of the reference tyre

|  |  | Reinforcers | Assembly | Angle |
|---|---|---|---|---|
| Protective reinforcement | Layer 1 | E18.23 | 3 × (1 + 5) × 0.23 | −24° |
| Protective reinforcement | Layer 2 | E18.23 | 3 × (1 + 5) × 0.23 | 24° |
| Working reinforcement | Layer 3 | 13.30 FR | (4 + 9) × 0.30 | −24° |
| Working reinforcement | Layer 4 | 13.30 FR | (4 + 9) × 0.30 | 24° |
| Triangulation layer | Layer 5 | 13.30 FR | (4 + 9) × 0.30 | −65° |

Table 1 describes the layers that make up the crown of the reference tyre. The reinforcers of the layers are cables, the assembly of which is mentioned for each layer. The angles that the reinforcers make with the circumferential direction of the tyre are also mentioned.

The formulations of the assemblies of the cables that end in FR mean that the cables are wrapped. The cables are provided with a wrapping thread of small diameter, between 0.10 mm and 0.3 mm, wound in a helix on the external surface of the cable. For example, the cable 13.30 FR has a wrap with a diameter of 0.18 mm.

The tyre according to the invention comprises the components described in Table 2 below:

TABLE 2

Crown reinforcement of the tyre according to the invention

|  |  | Reinforcers | Assembly | Angle | ER | TR | Elastic moduli | Spacing |
|---|---|---|---|---|---|---|---|---|
| Low-modulus layer | Layer 1 | E24.26 | 4 × (1 + 5) × 0.26 | 24° | 2600N | 1060 N/mm | 42 GPa | 2.5 mm |
| Rigid layer | Layer 2 | 26.30 FR | 3 × 0.35 + (4 + 14) × 0.30 | −20° | 6200N | 1800 N/mm | 144 GPa | 2 mm |
| Triangulation layer | Layer 3 | 13.30 FR | (4 + 9) × 0.30 | −65° | 3000N | 1500 N/mm | 174 GPa | 3.4 mm |

Table 2 describes the layers that make up the simplified crown of the tyre according to the invention. Indicated are the cables used as reinforcers, their assembly, and the angles that they make with the circumferential direction of the tyre. Mechanical properties of the layers are mentioned: the breaking force of the cables, the breaking tension of the layers and the axial spacing of the reinforcers for each layer.

The tyre according to the invention, in the configuration tested here, differs from the reference tyre by the elimination of layers of the crown reinforcement so as to be limited to a radially innermost triangulation layer, followed by a rigid layer formed of reinforcers wrapped with 26 metal threads each measuring 30 hundredths of a millimetre, and a low-modulus layer formed of 24 metal threads each having a diameter of 26 hundredths of a millimetre.

The assembly of the reinforcers in the low-modulus layer has the formulation 4×(1+5)×0.26, meaning that the reinforcers are multistrand ropes made up of 4 strands, each strand comprising an internal layer of 1 internal thread and an external layer of 5 external threads wound in a helix around the internal layer, the threads having a section with a diameter of 0.26 mm.

The reinforcers of the low-modulus layer have a tensile elastic modulus equal to 42 GPa, a force at break equal to 260 daN, are axially distributed at a spacing equal to 2.5 mm, and form an angle Alpha1 of 24° with the circumferential direction XX'. The breaking tension of the low-modulus layer is 106 daN/mm.

As regards the rigid layer, the reinforcers are cables having three layers of threads, assembled according to the formulation 3×0.35+(4+14)×0.30. The first layer comprises 3 threads with a diameter of 0.35 mm, followed by the second with 4 threads with a diameter of 0.30 mm, and the third layer comprises 14 threads with a diameter of 0.30 mm. The reinforcers thus defined have a force at break equal to 620 daN, are axially distributed at a spacing equal to 3.4 mm, and form an angle Alpha1 of −20° with the circumferential direction XX'. The breaking tension of the rigid layer is 176 daN/mm.

The triangulation layer comprises reinforcers which are cables having two layers of threads, assembled according to the formulation (4+9)×0.30. The first layer comprises 4 threads with a diameter of 0.30 mm, followed by the second layer with 9 threads with a diameter of 0.30 mm. The reinforcers thus defined have a force at break equal to 300 daN, are axially distributed at a spacing equal to 2.0 mm, and form an angle Alpha1 of −65° with the circumferential direction XX'. The breaking tension of the triangulation layer is 140 daN/mm.

The above-described tyre according to the invention clearly meets the objective of the claimed patent. The intended objective of a saving in the industrial manufacturing cost is achieved with a weight of the tyre according to the invention that is lower than that of the reference tyre by 7%. The saving of weight results from the elimination, in the reference tyre, of a protective layer and a working layer.

The strength of the crown of the tyre according to the invention when passing over obstacles on the road is at a level comparable to that of the reference tyre. The low-modulus layer, which is formed of elastic E24.26 multistrand ropes, also has a protective function with a performance level sufficient to replace the two layers of the E18.23 protective reinforcement of the crown of the reference tyre.

The endurance was evaluated by way of finite-element calculations on the reference tyre and the tyre according to the invention, making it possible to calculate the tensions in the carcass layer and the shear stresses at the ends of the layers of the crown reinforcement.

To evaluate these performance aspects, the tyre was subjected to calculations with a vertical load of 14 000 kg, a drift thrust of 6000 daN, and an inflation pressure of 450 kPa.

In the version of the tyre with the triangulation layer, the carcass layer is still under relative tension, thereby obviating the risk of buckling. The shear stresses at the ends of the layers of the crown are sufficiently low as to not have a negative effect on endurance.

The invention makes it possible to lighten the tyre while making it possible to transmit the forces for guiding the vehicle without impairing the integrity of the compounds at the axial ends of the layers.

The invention claimed is:

1. A tire for a heavy-duty vehicle, the tire comprising:
a nominal section B within the meaning of the European Tyre and Rim Technical Organisation (ETRTO) standard;
a tread;
a carcass reinforcement; and
a crown reinforcement radially on an inside of the tread and radially on an outside of the carcass reinforcement, the crown reinforcement including:
   at least one low-modulus layer formed of low-modulus elastic metal reinforcers, which are coated in an elastomeric material, the low-modulus reinforcers being mutually parallel and forming an angle Alpha1 with a circumferential direction tangential to a circumference of the tire, the low-modulus reinforcers having a structural elongation at least equal to 0.4% and a total elongation at break at least equal to 3%, and the tensile elastic modulus of the low-modulus reinforcers being between 40 GPa and 130 GPa;
   a rigid layer formed of rigid metal reinforcers, which are coated in an elastomeric material, the rigid metal reinforcers being mutually parallel and forming an angle Alpha2 with the circumferential direction tangential to the circumference of the tire, the structural elongation of the rigid metal reinforcers being less than or equal to 0.2%, and the tensile elastic modulus of the rigid reinforcers being between 140 GPa and 200 GPa; and
   a triangulation layer comprising metal reinforcers, which are coated in an elastomeric material, the metal reinforcers being mutually parallel and forming an angle Beta with the circumferential direction tangential to the circumference of the tire,
wherein the angle Beta is greater than or equal to 50° in terms of absolute value,
wherein a breaking tension of the rigid layer is greater than or equal to 120 daN/mm,
wherein a ratio of the breaking tension of the rigid layer to that of the at least one low-modulus layer is greater than or equal to 1.2,
wherein the breaking tension of the at least one low-modulus layer is greater than or equal to 80 daN/mm,
wherein an axial width of the at least one low-modulus layer is greater than an axial width of the rigid layer by a distance DNT at least equal to 10 mm at each axial end, and
wherein at least one low-modulus layer is in contact with the rigid layer over an axial width W at least equal to 20% of the nominal section B of the tire and the triangulation layer is positioned on an inside of the rigid layer and in contact therewith in the radial direction.

2. The tire according to claim 1, wherein the rigid layer comprises reinforcers provided with a wrapping thread of small diameter, between 0.10 mm and 0.3 mm, wound in a helix on an external surface of the reinforcers.

3. The tire according to claim 2, wherein the at least one low-modulus layer is positioned on an outside of the rigid layer in a radial direction.

4. The tire according to claim 1, wherein an axial width of the triangulation layer, measured in a meridian cross section of the tire, is less than that of the at least one low-modulus layer and greater than that of the rigid layer.

5. The tire according to claim 1, wherein an absolute value of the angle Alpha1 of the reinforcers of the at least one low-modulus layer is greater than or equal to an absolute value of the angle Alpha2 of the rigid layer.

6. The tire according to claim 1, wherein the crown reinforcement comprises at least one layer formed of elastic metal reinforcers, an angle of which with the circumferential direction of the tire is less than or equal to 10°.

7. The tire according to claim 1, wherein a layer of elastomeric compound is positioned toward an inside in a radial direction beneath the at least one low-modulus layer and in contact with the at least one low-modulus layer vertically in line with the end of the rigid layer.

8. The tire according to claim 7, wherein the layer of elastomeric compound has a tensile stiffness modulus less than or equal to 4.5 MPa.

* * * * *